(12) United States Patent
Yukawa et al.

(10) Patent No.: US 6,581,662 B2
(45) Date of Patent: Jun. 24, 2003

(54) PNEUMATIC TIRE WITH SPECIFIED BAND CORD

(75) Inventors: Naoki Yukawa, Kobe (JP); Kazumi Yamazaki, Kobe (JP); Takashi Tanaka, Kobe (JP); Yasuo Wada, Kobe (JP); Makoto Hizume, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/986,728

(22) Filed: Nov. 9, 2001

(65) Prior Publication Data

US 2002/0079037 A1 Jun. 27, 2002

(51) Int. Cl.$^7$ ............................... B60C 9/20; B60C 9/22
(52) U.S. Cl. ..................... 152/527; 152/531; 152/533
(58) Field of Search ............................ 152/531, 533, 152/527

(56) References Cited

U.S. PATENT DOCUMENTS 5,558,144 A * 9/1996 Nakayasu et al. ....... 152/531 X
6,425,426 B1 * 7/2002 Osborne et al. ........ 152/533 X

* cited by examiner

Primary Examiner—Adrienne C. Johnstone
(74) Attorney, Agent, or Firm—Birch, Stewart, Kolasch & Birch, LLP

(57) ABSTRACT

A pneumatic tire comprises a breaker disposed radially outside a carcass crown portion, and a band disposed radially outside of the breaker and comprising a full-width band ply extending over the substantially overall width of the breaker, wherein a cord or cords of said full-width band ply existing in a tread crown region satisfy the following conditions: $T>0.8$; $0 \leq K+6.67T-21.7$; $0 \leq 45-10T-K$; $0 \leq 106.8-57.5T-K$; and $7 \leq E \leq 13$, wherein the symbol "K" is an stretch-resistance index (N) of a cord which is defined as the product of the sectional area S in sq.mm and 2% modulus M in N/sq.mm of the cord divided by 100, the symbol "T" is an stretch in % of the cord in the tire being in its natural state without being mounted on a wheel rim, and the symbol "E" is a cord count per 1 cm width of the full-width band ply.

7 Claims, 7 Drawing Sheets

PNEUMATIC TIRE WITH SPECIFIED BAND CORD

BACKGROUND OF THE INVENTION

The present invention relates to a pneumatic tire, more particularly to a tread reinforcing structure being capable of reducing tire noise during running.

In order to improve high-speed durability of a pneumatic tire especially a radial tire for passenger cars, a single-layered full-width nylon band over a breaker is widely used. Here, a band means a cord layer whose cord angle is less than about 10 degrees usually less than 5 degrees with respect to the tire equator, and a breaker means a cord layer whose cord angle is more than 10 degrees usually more than 15 degrees.

Such a single-layered full-width band can reduce a road noise around a frequency of 250 Hz heard on the inside of a vehicle during running. By providing a single-layered full-width band made of a high tensile modulus aramid cord instead of the relatively low modulus nylon cord, such a road noise may be reduced more, but a pass-by noise heard on the outside of a vehicle during running tends to increase.

BRIEF SUMMARY OF THE INVENTION

It is therefore, an object of the present invention to provide a pneumatic tire, in which the road noise and pass-by noise can be improved.

According to the present invention, a pneumatic tire comprises a carcass extending between bead portions through a tread portion and sidewall portions, a breaker disposed radially outside a crown portion of the carcass and made of cords laid at an angle of from 15 to 40 degrees with respect to the tire equator, a band disposed radially outside the breaker and comprising a full-width band ply extending over the substantially overall width of the breaker and made of at least one cord forming a small angle with respect to the tire equator, wherein a cord or cords of said full-width band ply existing in a tread crown region satisfy the following conditions Eq.1–Eq.5, $$T > 0.8 \quad \text{Eq.1}$$

$$0 \leq K + 6.67T - 21.7 \quad \text{Eq.2}$$

$$0 \leq 45 - 10T - K \quad \text{Eq.3}$$

$$0 \leq 106.8 - 57.5T - K \quad \text{Eq.4}$$

$$7 \leq E \leq 13 \quad \text{Eq.5}$$

wherein the tread crown region is defined as a region centered on the tire equator and having an axial width of either 30 mm or 25% of the axial width of the breaker which is not less than the other, the symbol "K" is an stretch-resistance index (N) of a cord which is defined as the product of the sectional area S in sq.mm and 2% modulus M in N/sq.mm of the cord divided by 100, the symbol "T" is an stretch in % of the cord in the tire being in its natural state without being mounted on a wheel rim, and the symbol "E" is a cord count per 1 cm width of the full-width band ply.

BRIEF DESCRIPTION OF THE DRAWINGS

Embodiments of the present invention will now be described in detail in conjunction with the accompanying drawings.

DETAILED DESCRIPTION

Figure 1:
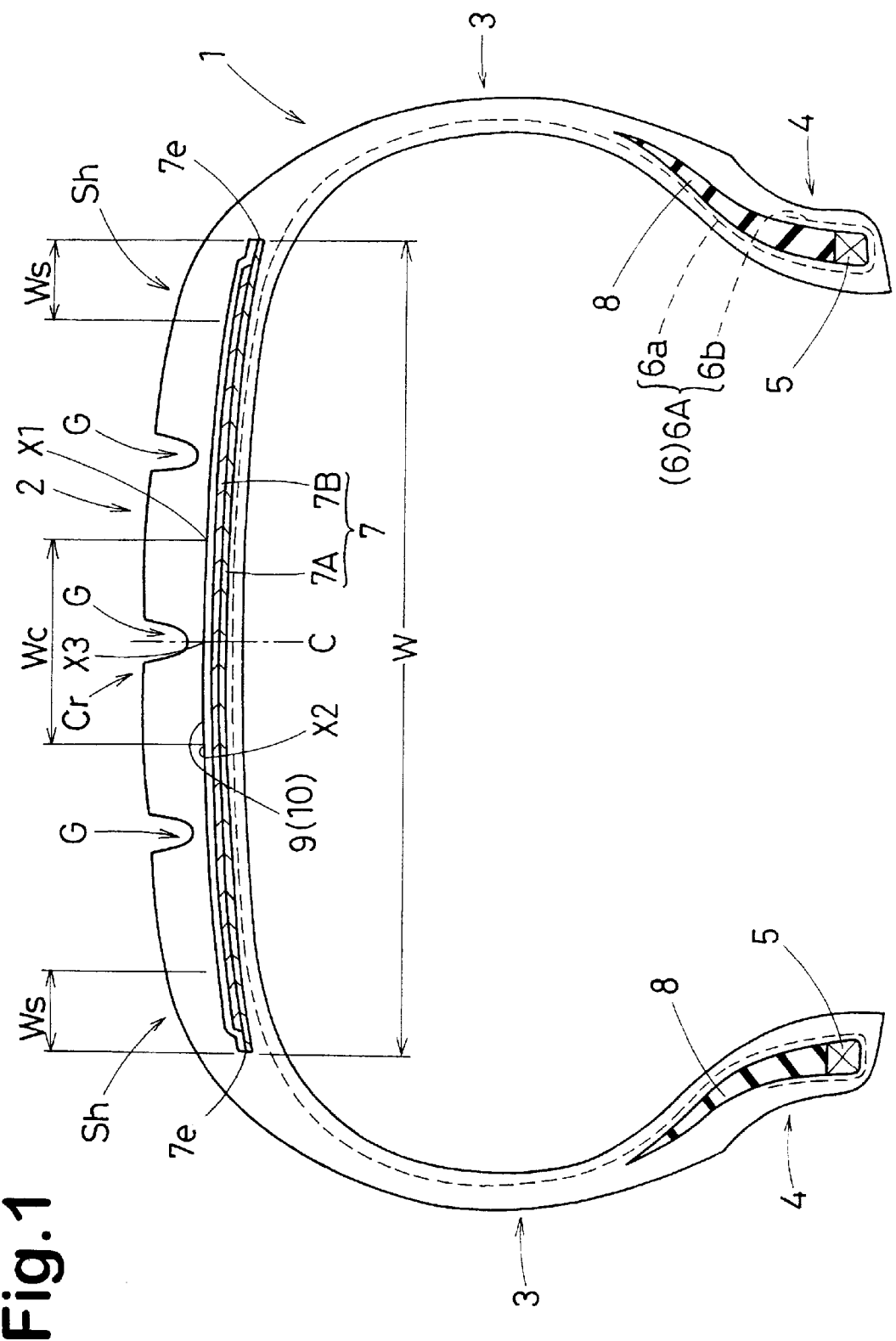
FIG. 1 is a cross sectional view of a pneumatic tire of the present invention.

In the drawings, pneumatic tire 1 according to the present invention comprises a tread portion 2, a pair of sidewall portions 3, a pair of bead portions 4, a carcass 6 extending between the bead portions 4, a breaker 7 disposed radially outside the carcass 6 in the tread portion 2, and a band 9 disposed on the radially outside of the breaker 7. The tread portion 2 is provided with tread grooves G which may include circumferentially continuously extending grooves and/or circumferentially extending discontinuous grooves.

The tire 1 in this example is a passenger car radial tire having a relatively low aspect ratio of 60%. The aspect ratio is measured under a normally inflated unloaded state. The normally inflated unloaded state is such that the tire is mounted on a standard rim and inflated to a standard load but loaded with no tire load. The undermentioned tread width is the maximum axial width between the edges of the ground contacting area of the tread portion 2 under a standard loaded condition in which the tire is mounted on the standard rim and inflated to the standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The carcass 6 comprises at least one ply 6A of cords arranged radially at an angle of from 75 to 90 degrees with respect to the tire equator C, extending between the bead portions 4 through the tread portion 2 and sidewall portions 3, and turned up around the bead core 5 in each bead portion 4 from the inside to the outside of the tire so as to form a pair of turnups 6b and a carcass main 6a therebetween. For the carcass cords, organic fiber cords, e.g. polyester, nylon, rayon, aramid and the like and steel cords can be used. In this example, the carcass 6 is composed of a single ply 6A of polyester cords arranged radially at 90 degrees.

Between the carcass main 6a and turnup 6b in each of the bead portions, there is disposed a bead apex 8 of hard rubber extending radially outwardly from the bead core 5 while tapering towards its radially outer end.

The breaker 7 is composed of at least two cross plies 7A and 7B of cords laid parallel with each other at an angle of from 15 to 45 degrees with respect to the tire equator C. For the breaker cords, steel cords and high tensile modulus organic cords such as aramid, rayon and the like can be used. The width W of the breaker 7 is set in a range of from 80 to 110% of the above-mentioned tread width. In this example, steel cords are used, and the radially inner breaker ply 7A is wider than the radially outer ply 7B. The axial width W of the breaker 7 is defined as the axial width between the axial edges 7e of the widest ply 7A.

In this example, the band 9 is composed of a single ply 10. This ply 10 extends over the substantially overall width of the breaker 7 and made of windings of one or more cords 11 wound on the radially outside of the breaker 7 at an angle of not more than 5 degrees with respect to the tire equator C. (hereinafter, the "full-width band ply 10").

Figure 2A:
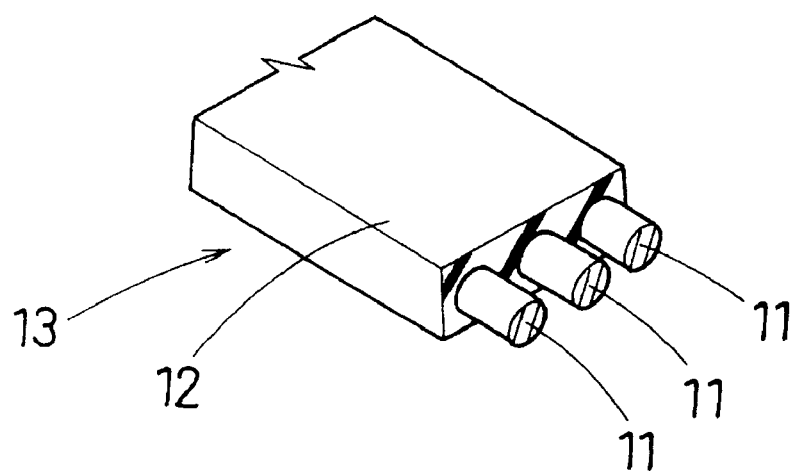
FIGS. 2A and 2B show a rubber tape in which cords are embedded and a rubber coated single cords, respectively, which can be used to make a band.
Figure 2B:
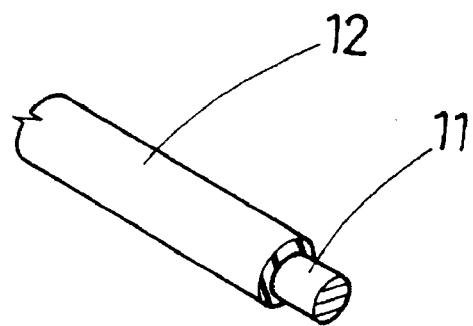

The full-width band ply 10 may be formed by winding a single cord 11 coated with topping rubber 12 as shown in FIG. 2B or a plurality of band cords 11 laid side by side and embedded in topping rubber 12 in a form of tape as shown in FIG. 2A (hereinafter the "rubber tape 13").

According to the present invention, the windings of the cord(s) 11 of the band 9 which exist in the tread crown region Cr satisfy the following conditions (Eq.1–Eq.5):

$$T > 0.8 \quad \text{Eq.1}$$

$$0 \leq K + 6.67T - 21.7 \quad \text{Eq.2}$$

$$0 \leq 45 - 10T - K \quad \text{Eq.3}$$

$$0 \leq 106.8 - 57.5T - K \quad \text{Eq.4}$$

$$7 \leq E \leq 13 \quad \text{Eq.5}$$

The tread crown region Cr is defined as a region centered on the tire equator C and having an axial width Wc of either 30 mm or 25% of the axial width W of the breaker 7, which is not smaller than the other.

If the band cord(s) 11 is defined as above only in a central region which is narrower than the crown region Cr, the pass-by noise can not be reduced. Thus, at least in the above-mentioned width Wc, the band cord(s) should be defined as above. Preferably, the above-mentioned conditions (Eq.1–Eq.5) are satisfied by the band cord(s) existing in a width of more than 30%, more preferably more then 50%, but preferably not more then 80% of the axial width W of the breaker 7. If the width is more than 80%, it becomes difficult to reduce the road noise.

The symbol "K" used in Eq.2–Eq.4 is an stretch-resistance index of a cord which is defined as the product of the 2% modulus M (N/sq.mm) and sectional area S (sq.mm) of the cord divided by 100. (K=S×M/100) The 2% modulus M is a tensile elastic modulus at 2% stretch of the cord measured according to the Japanese Industrial Standard-L1017, "Testing Methods for Chemical Fiber Tie Cords".

The symbol "T" used in Eq.1–Eq.4 is the stretch (%) of a cord in the tire under such a condition that the tire is in its natural state without being mounted on a wheel rim. In practice, the stretch T (%) can be measured as follows.

Figure 3A:
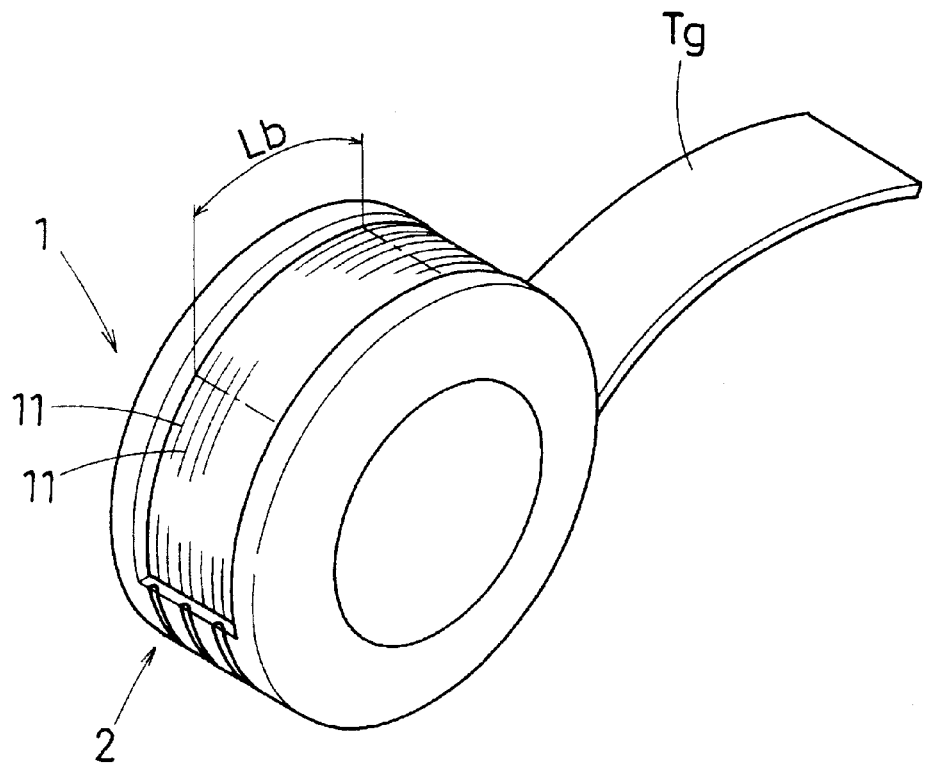
FIGS. 3a and 3b are diagrams for explaining a method of measuring the stretch T of a cord embedded in a tire.
Figure 3B:
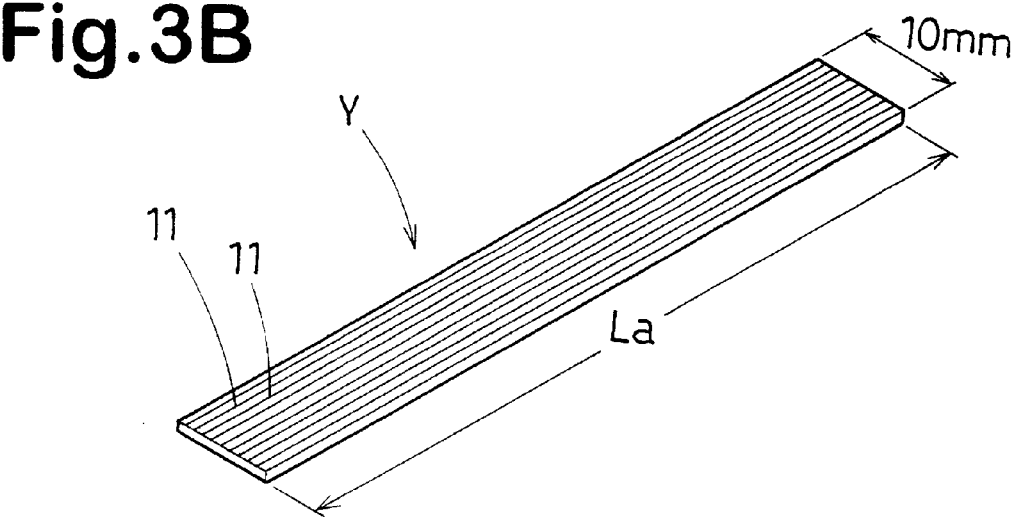

First, as shown in FIG. 3A, the tread rubber Tg is partially removed from the tire being in its natural state so as to become possible to specify some cords 11 to be measured and then the length Lb of the cord 11 being left in the tire is measured. It is preferable for accuracy that the length Lb is about one meters and the measurement is made at least three different positions. After the length Lb is measured, the cord 11 of the length Lb is took out from the tire as a tape-like specimen Y of about 10 mm width together with the surrounding rubber and adjacent cords as shown in FIG. 3B. And the cord 11 separated therefrom is left as it is for 24 hours at a temperature of 20 deg.C. and a humidity of 65% to be freed from its residual stress and thus return to its original length La, and then the length La is measured to calculate the above-mentioned stretch T (%) as (Lb−La)/Lb×100.

By making the band 7 to satisfy the above conditions, the band can provide for the breaker 7 with a hooping force which can not be realized by a conventional nylon cord band but which is decreased when comparison with that of a conventional aramid cord band.

The above-mentioned condition Eq.1 gives a lower limit of the stretch T. If the stretch T of the band cord 11 in the tread crown region Cr is less than 0.8%, even a minimum hooping force necessary for the breaker 7 can not be obtained, and it becomes difficult to improve the high-speed durability and road noise.

The stretch T is preferably set in a range of not less than 1.0%. (T≧1)

The condition Eq.2 specifies a lower limit of the stretch-resistance index K relatively to the stretch T. By satisfying this limitation, an essential road noise reducing effect can be obtained, namely, the road noise at 250 Hz is reduced by at least 1.0 (dB). If K<−6.67T+21.7, then as the hooping force to the breaker 7 decreases, road noise can not be reduced effectively. The stretch-resistance index K is preferably not less than −6.67T+22.9 (thus, 0<K+6.67T−22.9), more preferably not less than −6.67T+25.2 (thus, 0≦K+6.67T−25.2)

The condition Eq.3 specifies an upper limitation of the stretch-resistance index K relatively to the stretch T. If the stretch-resistance index K is over the upper limitation, the pass-by noise is liable to increase. The stretch-resistance index K is preferably not more than 42−10T (thus, 0≦42−10T−K), more preferably not more than 40−10T (thus, 0≦40−10T−K).

The condition Eq.4 specifies an upper limit of the stretch T relatively to the index K. If the stretch T is over the upper limit, then the residual stress of the cord 11 increases and pass-by noise deteriorates. This condition Eq.4 also means the stretch T is absolutely less than about 1.86% because K must be a positive value. The stretch T is preferably not more than (101.1−K)/57.5 (thus, 0≦101.1−57.5T−K), more preferably not more than (95.3−K)/57.5 (thus, 0≦95.3−57.5T−K).

The condition Eq.5 specifies the cord count E per 1 cm width of the band ply. If the cord count E is less than 7, then the hooping force to the breaker 7 becomes insufficient. If the cod count E is more than 13, the hooping force becomes excessive and the pass-by noise is liable to increase.

As to the material of the band cord 11, for example, polyethylene-2,6-naphthalate (hereinafter "PEN"), aramid, polyparaphenylene benzobis oxazole (hereinafter "PBO"), steel and the like can be used. Especially, PEN is preferably used. In addition to a cord made of a single material, a hybrid cord of two or more different organic filaments twisted together, for example PEN+aramid, aramid+PBO and the like may be also used. Preferably, an organic fiber cord having a 2% modulus M of not less than 10000 N/sq.mm, more preferably not less than 12000 N/sq.mm is used. If the 2% modulus is less, it becomes difficult to make a green tire, and the durability tends to decrease.

The sectional area S of the band cord 11 is set in a range of not less than 0.05 sq.mm preferably not less than 0.08 sq.mm more preferably 0.13 to 0.35 sq.mm. If the sectional area S is less, the selection of the cord material becomes difficult. If the sectional area S is increased more, it becomes difficult to make a green tire, and the durability tends to decrease.

Preferably, the ratio (Tc/Ts) of the stretch Tc of the band cord(s) in the crown region Cr to the stretch Ts of the band cord(s) in a shoulder region Sh is set in a range of from 0.8 to 1.3, preferably 0.9 to 1.1, whereby the road noise and pass-by noise can be further improved. The shoulder region Sh is a region of 10% of the axial width W of the breaker 7 extending axially inwards from each of the axial edges 7e of the breaker 7.

Figure 4:
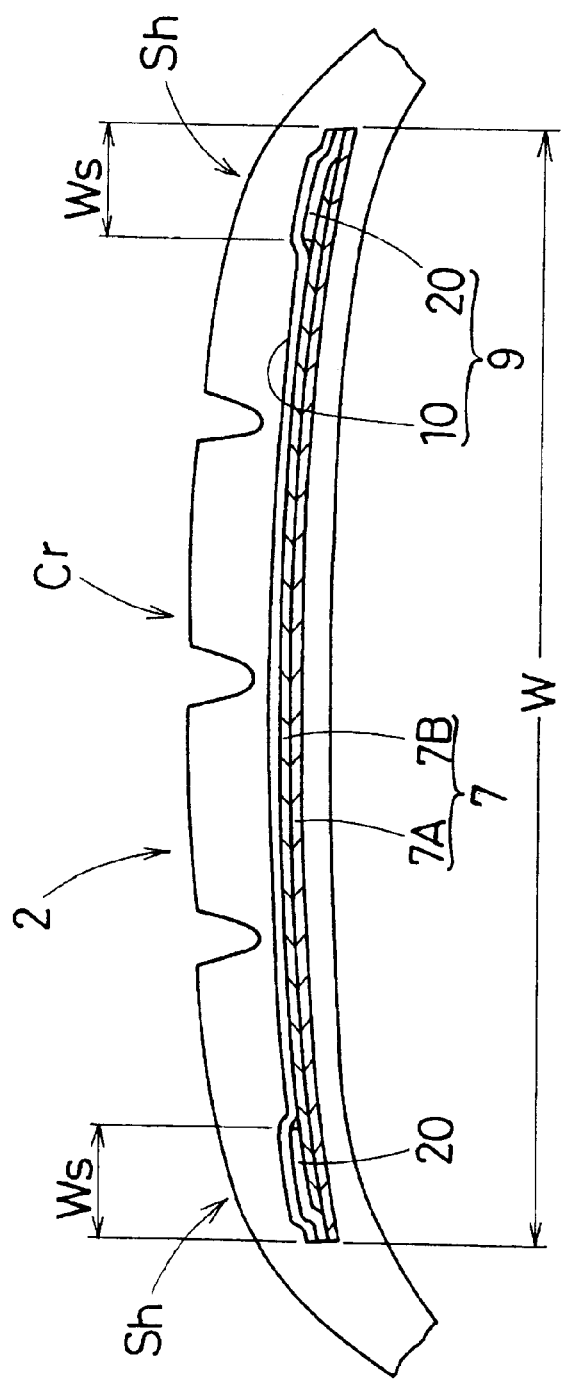
FIG. 4 is a schematic cross sectional view showing a modification of the example of the band shown in FIG. 1.

FIG. 4 shows a modification of the above-mentioned band 9, which is composed of the above-mentioned full-width band ply 10 and a pair of axially spaced edge band plies 20. Each edge band ply 20 preferably has an axial width of less than 10% of the breaker width W and disposed within the shoulder region Sh outside the crown region Cr.

In the above-mentioned examples, the band cord or cords are materially and structurally the same between the crown region and shoulder region. However, it may be also possible to use materially and/or structurally different band cords.

Figure 5A:
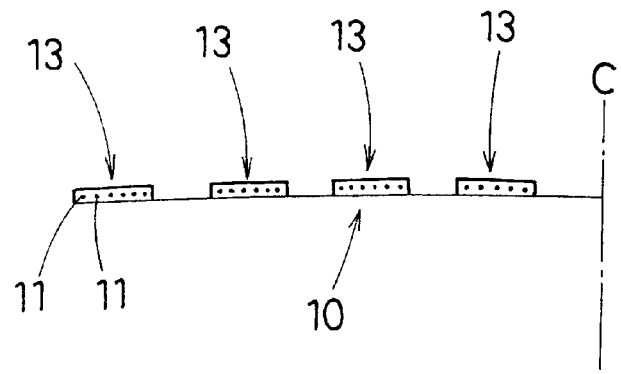
FIGS. 5A, 5B and 5C are diagrams showing examples of winding of the rubber tape.
Figure 5B:
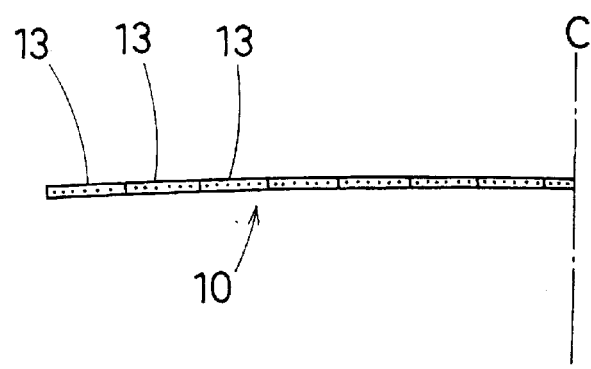
Figure 5C:
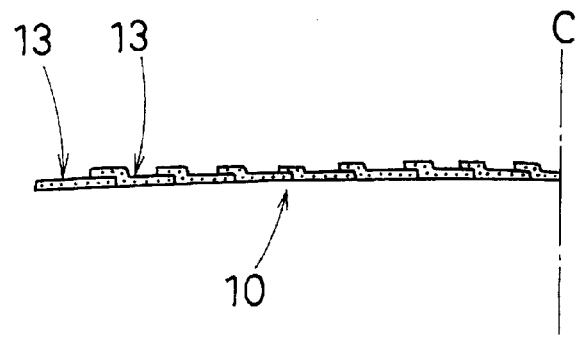

FIG. 5A shows an example in which a rubber tape 13 is spirally wound on the breaker 7 while leaving space between the windings. FIG. 5B shows another example in which the windings are butted. FIG. 5C shows still another example in which the windings are overlapped. Thus, the above-mentioned cord count E can be adjusted.

Figure 6A:
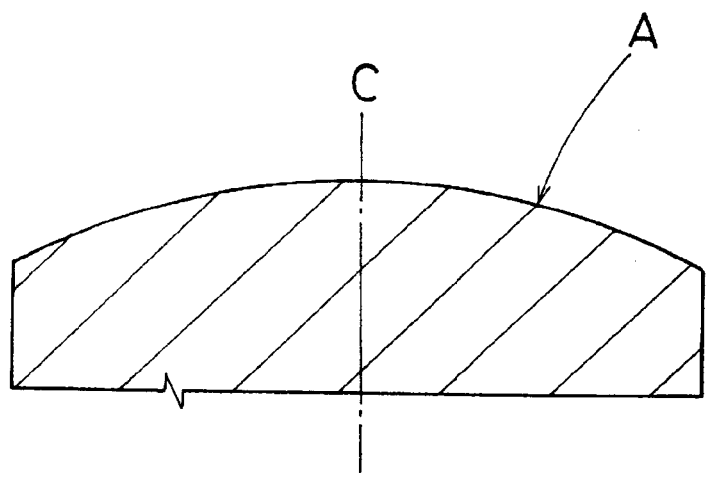
FIG. 6A and 6B are diagrams for explaining profiled drums for making a band.
Figure 6B:
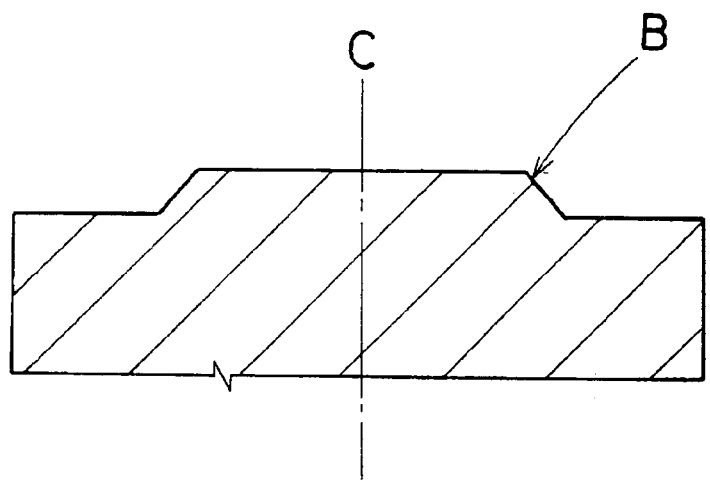

The stretch T of the band cord 11 can be adjusted by selecting the material of the band cord and/or changing twist number, twist pitch, cord structure and the like. Further, it is also possible to adjust the stretch T by changing the winding diameter of the cord(s) along the tire axial direction when making a green tire. This may be a simple and easy method which is effective in case of organic fiber cords. For example, if the band is formed by winding the cord(s) directly or indirectly around a drum having a convex profile (A) resembling the finished profile as shown in FIG. 6A, the stretch T decreases and the difference between the crown region and shoulder region becomes small. However, if a profiled drum as shown in FIG. 6B is used, as the central part is flat in its cross section, when the finished profile is convex, the stretch increases gradually from the tire equator towards both sides thereof at a relatively small rate, but as a step (B) is provided, the stretch increases abruptly, and thereafter again the stretch increases at a small rate. Thus, the above-mentioned ratio (Tc/Ts) can be easily adjusted.

Comparison Tests

Test tires of size 195/60R15 91H (Rim size 15×6JJ) for passenger cars having the same structure shown in FIG. 1 except for the band structure were made and tested for the road noise and pass-by noise. The specifications of the band are shown in Table 1.

1) Road Noise Test

A Japanese 2000 cc FF passenger car provided on all the four wheels with test tires (pressure 200 kPa) was run on an asphalt road having a smooth road surface at a speed of 50 km/hr, and a sound pressure level (dB) of 250 Hz was measured near the left ear of the driver using a ⅓ octave band pass filter. The results are indicated in Table 1 as a difference from Ref.1.

2) Pass-By Noise Test

According to the "Test Procedure for Tire Noise" specified in Japanese JASO-C606, a test car provided with test tires was coasted for 50 meters at a speed of 53 km/h in a straight test course (asphalt road) and the maximum noise sound level was measured with a microphone set at 1.2 meter height from the road surface and 7.5 meter sideways from the running center line. The results are indicated in Table 1 as a difference from Ref.1.

Figure 7:
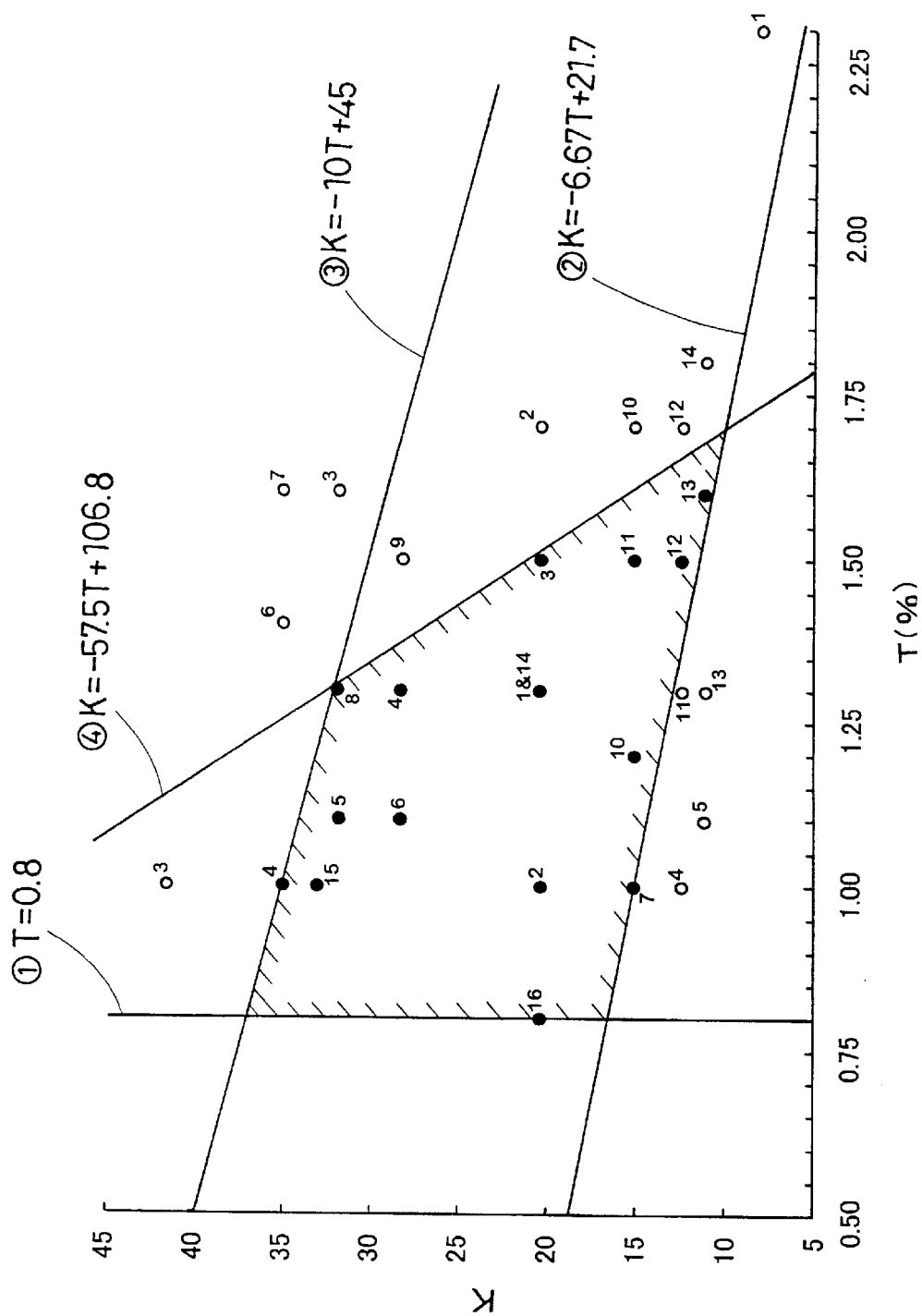
FIG. 7 is a graph showing test results.

The test results are also plotted in a graph shown in FIG. 7, wherein a black dot means both the road noise and pass-by noise were improved and corresponds to one of the Ex. tires. Contrary, a white dot means both were not improved and corresponds to one of the Ref. tires.

The present invention can be suitably applied to radial tires for passenger cars as above, but it may be also possible to apply the present invention to radial tires for light trucks, heavy duty radial tires and the like.

TABLE 1

| Tire | Ref. 1 | Ref. 2 | Ex. 1 | Ex. 2 | Ex. 3 | Ref. 3 | Ex. 4 | Ex. 5 | Ex. 6 | Ex. 7 |
|---|---|---|---|---|---|---|---|---|---|---|
| Band Structure | 1FB | 1FB | 1FB | 1FB | 1FB | 1FB | 1FB | 1FB | 1FB | 1FB |
| Band cord material | nylon | PEN | PEN | PEN | PEN | PEN | PEN | PEN | PEN | PEN |
| 2% modulus (N/sq. mm) | 3230 | 12590 | 12590 | 12590 | 12590 | 12810 | 10800 | 9830 | 8730 | 9300 |
| Sectional area S (sq. mm) | 0.248 | 0.162 | 0.162 | 0.162 | 0.162 | 0.324 | 0.324 | 0.324 | 0.324 | 0.162 |
| Index K | 8 | 20.4 | 20.4 | 20.4 | 20.4 | 41.5 | 35 | 31.8 | 28.3 | 15.1 |
| Elongation Tc (%) in crown | 2.3 | 1.7 | 1.3 | 1 | 1.5 | 1 | 1 | 1.1 | 1.1 | 1 |
| Elongation Ts (%) in shoulder | 1.6 | 1.3 | 0.8 | 0.8 | 0.9 | 0.8 | 0.8 | 0.9 | 0.9 | 0.8 |
| Tc/Ts | 1.44 | 1.31 | 1.63 | 1.25 | 1.67 | 1.25 | 1.25 | 1.22 | 1.22 | 1.25 |
| Eq. 1 Tc − 0.8 | 1.5 | 0.9 | 0.5 | 0.2 | 0.7 | 0.2 | 0.2 | 0.3 | 0.3 | 0.2 |
| Eq. 2 K + 6.67T − 21.7 | 1.7 | 10 | 7.4 | 5.4 | 8.7 | 26.5 | 20 | 17.5 | 13.9 | 0 |
| Eq. 3 45 − 10T-K | 14 | 7.6 | 11.6 | 14.6 | 9.6 | −6.5(x) | 0 | 2.2 | 5.7 | 19.9 |
| Eq. 4 106.8 − 57.5T-K | −33.5(x) | −11.3(x) | 11.7 | 28.9 | 0.2 | 7.8 | 14.3 | 11.7 | 15.3 | 34.2 |
| Eq. 5 Cord count E/1cm | 10 | 10 | 10 | 10 | 10 | 10 | 10 | 10 | 10 | 10 |
| Road noise (dB) | 0 | −3.1 | −2.1 | −1.8 | −2.5 | −3.9 | −3 | −2.7 | −2.4 | −1.5 |
| Pass-by noise (dB(A)) | 0 | 0.5 | 0 | −0.1 | 0.1 | 0.4 | 0.1 | 0 | −0.1 | −0.2 |

| Tire | Ref. 4 | Ref. 5 | Ref. 6 | Ref. 7 | Ex. 8 | Ref. 8 | Ex. 9 | Ref. 9 | Ex. 10 | Ex. 11 |
|---|---|---|---|---|---|---|---|---|---|---|
| Band Structure | 1FB | 1FB | 1FB | 1FB | 1FB | 1FB | 1FB | 1FB | 1FB | 1FB |
| Band cord material | PEN | PEN | PEN | PEN | PEN | PEN | PEN | PEN | PEN | PEN |
| 2% modulus (N/sq. mm) | 7680 | 6870 | 10800 | 10800 | 9830 | 9830 | 8730 | 8730 | 9300 | 9300 |
| Sectional area S (sq. mm) | 0.162 | 0.162 | 0.324 | 0.324 | 0.324 | 0.324 | 0.324 | 0.324 | 0.162 | 0.162 |
| Index K | 12.4 | 11.1 | 35 | 35 | 31.8 | 31.8 | 28.3 | 28.3 | 15.1 | 15.1 |
| Elongation Tc (%) in crown | 1 | 1.1 | 1.4 | 1.6 | 1.3 | 1.6 | 1.3 | 1.5 | 1.2 | 1.5 |
| Elongation Ts (%) in shoulder | 0.8 | 0.9 | 0.9 | 1.2 | 0.9 | 1.3 | 0.9 | 1.2 | 0.8 | 0.9 |

TABLE 1-continued

| Tire | | | | | | | | | | |
|---|---|---|---|---|---|---|---|---|---|---|
| Tc/Ts | 1.25 | 1.22 | 1.56 | 1.33 | 1.44 | 1.23 | 1.44 | 1.25 | 1.5 | 1.67 |
| Eq. 1 Tc − 0.8 | 0.2 | 0.3 | 0.6 | 0.8 | 0.5 | 0.8 | 0.5 | 0.7 | 0.4 | 0.7 |
| Eq. 2 K + 6.67T − 21.7 | −2.6(x) | −3.2(x) | 22.6 | 24 | 18.8 | 20.8 | 15.3 | 16.6 | 1.4 | 3.4 |
| Eq. 3 45 − 10T-K | 22.6 | 22.9 | −4 | −6 | 0.2 | −2.8 | 3.7 | 1.7 | 17.9 | 14.9 |
| Eq. 4 106.8 − 57.5T-K | 36.9 | 32.4 | −8.7 | −20.2 | 0.2 | −17 | 3.8 | −7.7 | 22.7 | 5.5 |
| Eq. 5 Cord count E/1cm | 10 | 10 | 10 | 10 | 10 | 10 | 10 | 10 | 10 | 10 |
| Road noise (dB) | −0.8 | −0.4 | −3.5 | −3.7 | −2.9 | −3.2 | −2.6 | −2.8 | −2 | −2 |
| Pass-by noise (dB(A)) | −0.2 | −0.3 | 0.4 | 0.6 | 0.1 | 0.4 | 0.1 | 0.3 | −0.1 | 0 |

| Tire | Ref. 10 | Ref. 11 | Ex. 12 | Ref. 12 | Ref. 13 | Ex. 13 | Ref. 14 | Ex. 14 | Ex. 15 | Ex. 16 |
|---|---|---|---|---|---|---|---|---|---|---|
| Band Structure | 1FB | 1FB | 1FB | 1FB | 1FB | 1FB | 1FB | 1EB+1FB | 1FB | 1FB |
| Band cord material | PEN | PEN | PEN | PEN | PEN | PEN | PEN | PEN | aramid | PEN |
| 2% modulus (N/sq. mm) | 9300 | 7680 | 7680 | 7680 | 6870 | 6870 | 6870 | 12590 | 29703 | 12590 |
| Sectional area S (sq. mm) | 0.162 | 0.162 | 0.162 | 0.162 | 0.162 | 0.162 | 0.162 | 0.162 | 0.111 | 0.162 |
| Index K | 15.1 | 12.4 | 12.4 | 12.4 | 11.1 | 11.1 | 11.1 | 20.4 | 33 | 20.4 |
| Elongation Tc (%) in crown | 1.7 | 1.3 | 1.5 | 1.7 | 1.3 | 1.6 | 1.8 | 1.3 | 1 | 0.8 |
| Elongation Ts (%) in shoulder | 1.2 | 0.9 | 1 | 1.2 | 0.9 | 1 | 1.3 | 0.8 | 1.1 | 0.8 |
| Tc/Ts | 1.42 | 1.44 | 1.5 | 1.42 | 1.44 | 1.6 | 1.38 | 1.63 | 0.91 | 1 |
| Eq. 1 Tc − 0.8 | 0.9 | 0.5 | 0.7 | 0.9 | 0.5 | 0.8 | 1 | 0.5 | 0.2 | 0 |
| Eq. 2 K + 6.67T − 21.7 | 4.7 | −0.6(x) | 0.7 | 2.1 | −1.9(x) | 0.1 | 1.4 | 7.4 | 17.9 | 4 |
| Eq. 3 45 − 10T-K | 12.9 | 19.6 | 17.6 | 15.6 | 20.9 | 17.9 | 15.9 | 11.6 | 2 | 16.6 |
| Eq. 4 106.8 − 57.5T-K | −6 | 19.6 | 8.1 | −3.4(x) | 20.9 | 3.7 | −7.8(x) | 11.7 | 16.3 | 40.4 |
| Eq. 5 Cord count E/1cm | 10 | 10 | 10 | 10 | 10 | 10 | 10 | 10 | 10 | 10 |
| Road noise (dB) | −2.2 | −0.9 | −1.5 | −2 | −0.6 | −1.5 | −1.7 | −2.8 | −2.8 | −3.2 |
| Pass-by noise (dB(A)) | 0.2 | −0.1 | 0 | 0.2 | −0.2 | −0.1 | 0.3 | −0.1 | −0.1 | −0.1 |

1FB: single-layered full-width band,
1EB: single-layered edge band
PEN = polyethylene-2,6-naphthalate

What is claimed is:

1. A pneumatic tire comprising
a carcass extending between bead portions through a tread portion and sidewall portions,
a breaker disposed radially outside a crown portion of the carcass and made of cords laid at an angle of from 15 to 40 degrees with respect to the tire equator,
a band disposed radially outside of the breaker and comprising a full-width band ply extending over the substantially overall width of the breaker and made of at least one cord forming a small angle with respect to the tire equator, wherein
a cord or cords of said full-width band ply existing in a tread crown region satisfy the following conditions Eq.1–Eq.5, $$T > 0.8 \quad \text{Eq.1}$$

$$0 \leq K + 6.67T - 21.7 \quad \text{Eq.2}$$

$$0 \leq 45 - 10T - K \quad \text{Eq.3}$$

$$0 \leq 106.8 - 57.5T - K \quad \text{Eq.4}$$

$$7 \leq E \leq 13 \quad \text{Eq.5}$$

wherein
the tread crown region is defined as a region centered on the tire equator and having an axial width of either 30 mm or 25% of the axial width of the breaker which is not less than the other,
the symbol "K" is an stretch-resistance index (N) of a cord which is defined as the product of the sectional area S in sq.mm and 2% modulus M in N/sq.mm of the cord divided by 100,
the symbol "T" is an stretch in % of the cord in the tire being in its natural state without being mounted on a wheel rim, and
the symbol "E" is a cord count per 1 cm width of the full-width band ply.

2. A pneumatic tire according to claim 1, wherein the band consists of said full-width band ply.

3. A pneumatic tire according to claim 1, wherein the band consists of said full-width band ply and a pair of axially spaced edge band plies each disposed radially outside an edge part of the breaker within a 10% width of the breaker width from the breaker edge.

4. A pneumatic tire according to claim 1, wherein the material of the band cord(s) is one of polyethylene-2,6-naphthalate and aramid.

5. A pneumatic tire according to claim 1, wherein the ratio (Tc/Ts) of the stretch $T_c$ of said cord or cords existing in the tread to an stretch $T_s$ of a cord or cords of the full-width band ply existing in a tread shoulder region is in a range of from 0.8 to 1.3, the tread shoulder region being defined as extending axially inwardly from each axial edge of the breaker by an axial width of 10% of the breaker width.

6. A pneumatic tire according to claim 1, wherein the full-width band ply is made of spiral windings of said cord or cords.

7. A pneumatic tire according to claim 6, wherein the full-width band ply is formed by spirally winding said cord or cords coated with topping rubber, leaving some space between the windings.

* * * * *